(12) United States Patent
Orkin et al.

(10) Patent No.: US 10,706,043 B2
(45) Date of Patent: Jul. 7, 2020

(54) SYSTEM AND METHOD FOR PROVIDING RESULTS BASED ON USER-SELECTED SEARCH BREAKS

(71) Applicant: WeDiscover, Inc., Los Angeles, CA (US)

(72) Inventors: Kenneth Orkin, Los Angeles, CA (US); Sondra Baker, Los Angeles, CA (US); Daniel Wade, Manhattan Beach, CA (US); Stephen Baker, Leesburg, VA (US)

(73) Assignee: WeDiscover, Inc., Los Angeles, CA (US)

( * ) Notice: Subject to any disclaimer, the term of this patent is extended or adjusted under 35 U.S.C. 154(b) by 0 days.

(21) Appl. No.: 16/472,283

(22) PCT Filed: Dec. 22, 2017

(86) PCT No.: PCT/US2017/068161
§ 371 (c)(1),
(2) Date: Jun. 21, 2019

(87) PCT Pub. No.: WO2018/119382
PCT Pub. Date: Jun. 28, 2018

(65) Prior Publication Data
US 2019/0377729 A1    Dec. 12, 2019

Related U.S. Application Data

(60) Provisional application No. 62/438,041, filed on Dec. 22, 2016.

(51) Int. Cl.
*G06F 3/0482* (2013.01)
*G06F 16/242* (2019.01)
*G06F 3/0484* (2013.01)

(52) U.S. Cl.
CPC ........ *G06F 16/2428* (2019.01); *G06F 3/0482* (2013.01); *G06F 3/04847* (2013.01)

(58) Field of Classification Search
CPC .................................................. G06F 3/0482
USPC ....................................................... 715/738
See application file for complete search history.

(56) References Cited

U.S. PATENT DOCUMENTS

| | | | |
|---|---|---|---|
| 2013/0311470 A1 | 11/2013 | Lotfi | |
| 2013/0346422 A1 | 12/2013 | Jordahl | |
| 2016/0162841 A1 | 6/2016 | Albright et al. | |
| 2018/0032570 A1* | 2/2018 | Miller | G06F 16/2425 |

(Continued)

*Primary Examiner* — William D Titcomb
(74) *Attorney, Agent, or Firm* — The Webb Law Firm

(57) ABSTRACT

Provided is a system for providing a computer-implemented targeted search interface including a graphical user interface including at least one selectable option and at least one untitled search break. The system includes a database having a plurality of search results. The system further includes a processor, programmed or configured to, in response to actuation of a first selectable option: generate at least one related search break; prompt the user to input user data; receive the user data; generate, from the user data, a user profile; identify at least one group of related users; and, in response to actuation of the at least one related search break, generate, on a graphical user interface, a plurality of subsets of the at least one related search break, wherein a subset of the plurality of subsets of the at least one related search break has a relationship with a group of related users.

26 Claims, 15 Drawing Sheets

(56) References Cited

U.S. PATENT DOCUMENTS

| | | | |
|---|---|---|---|
| 2019/0097909 A1* | 3/2019 | Puri | H04L 41/5035 |
| 2019/0205333 A1* | 7/2019 | Piramuthu | G06F 16/538 |
| 2019/0294719 A1* | 9/2019 | Beringer | G06F 16/2477 |
| 2019/0294720 A1* | 9/2019 | Beringer | G06F 16/285 |
| 2020/0042651 A1* | 2/2020 | Curtis | G06F 3/0482 |

* cited by examiner

SYSTEM AND METHOD FOR PROVIDING RESULTS BASED ON USER-SELECTED SEARCH BREAKS

CROSS-REFERENCE TO RELATED APPLICATIONS

This application is the United States national phase of International Application No. PCT/US2017/068161 filed Dec. 22, 2017, and claims the benefit of U.S. Provisional Patent Application No. 62/438,041 filed Dec. 22, 2016, the disclosures of which are hereby incorporated by reference in their entirety.

BACKGROUND OF THE INVENTION

Field of the Invention

This invention relates generally to providing search results and, particularly, to a system and method for providing search results based on user-selected search breaks.

Description of Related Art

Current search methods on web and mobile applications allow users to access a vast array of data. Search engines enable users to pose search questions, and the search engines employ various methods for retrieving results that are relevant to the question being posed. They do not, however, allow users to easily search for information that is relevant to them, their affinity groups, and/or social networks; nor do they employ a user interface specifically designed to easily enable them to generate search results that are relevant to them, their affinity groups, and/or social networks. For example, consider a user who wants to search for the best hotels in Hawaii. The user types in a search engine, "best hotels in Hawaii," and the search engine returns various lists of top hotels. However, the search engine does not identify the results for "best hotels in Hawaii" among people who are similar to the user, of interest to the user, or who are part of the user's actual or desired social network. Some search engines utilize drop down menus and toolbars to allow users to refine the characteristics of the object of their search (e.g., categorized as "luxury," "inexpensive," etc.), but none provide for refining and/or segmenting of the source dataset or "sample universe" (from which the results are generated) for relevance to the user (i.e., a "relevant search," as described herein).

Accordingly, it would be advantageous to have a system and method that allows users to easily select or tailor their searches through the use of a graphical user interface (GUI) that enables a search specific to one's own user profile and/or user profiles that are different from one's own profile, but of particular interest.

Thus, there exists a need for a graphical user interface (and search process) where a user can tailor selections easily using interface and database design that enables users to search easily for results specific and relevant to a user's individual profile, a user's social networks, and a user's social interests and affinities.

SUMMARY OF THE INVENTION

Accordingly, and generally, provided is an improved method and system for providing results based on user-selected search breaks. This approach allows for a number of benefits, including improved relevance of the search results, decreased search times, and potentially higher levels of confidence in the results retrieved by the search.

In one preferred and non-limiting embodiment or aspect, provided is a computer-implemented method for providing a targeted search interface, the method including: generating, with a processor, a graphical user interface including at least one selectable option and at least one untitled search break; generating, with a processor and on the graphical user interface, in response to actuation of a first selectable option of the at least one selectable option, at least one related search break and a prompt to a user to input user data; receiving, from the user, the user data, wherein the user data includes at least one of the following: age, gender, location, income, style, product type, service type, a search category, a parameter, a criterion, a keyword, natural language input, or any combination thereof; generating a user profile from the user data; identifying, by a processor, at least one group of related users based at least partially on at least the user profile; and generating, with a processor and on the graphical user interface or another graphical user interface, in response to actuation of the at least one related search break, a plurality of subsets of the at least one related search break wherein a subset of the plurality of subsets of the at least one related search break has a relationship, such as a one-to-one relationship, with the at least one group of related users.

In one preferred and non-limiting embodiment or aspect, the method further includes: receiving, via user input, at least one search term and/or one or more selection of a subset of the plurality of subsets of the at least one related search break; determining, by a processor, at least one chosen search result based at least partially on the at least one search term and/or the one or more selection of a subset of the plurality of subsets of the at least one related search break, the at least one chosen search result including at least one of the following: a product, a service, an activity, an interest, searchable information, or any combination thereof; and generating, with a processor and on the graphical user interface, the at least one chosen search result. In one preferred and non-limiting embodiment or aspect, the receiving one or more selection of a subset of the plurality of subsets of the at least one related search break includes: (a) receiving, via user input, a subset of the plurality of subsets of the at least one related search break; (b) displaying, on the graphical user interface or another graphical user interface, in response to a selection of a subset of the plurality of subsets of the related search break, the at least one related search break; (c) generating, with a processor and on the graphical user interface or another graphical user interface, in response to a next actuation of the at least one related search break, a plurality of subsets of the at least one related search break; and (d) repeating steps a through c until the user is finished making selections or no more selections can be made. In another preferred and non-limiting embodiment or aspect, the method further includes sharing, via a social media system, information related to a purchase or user selection of the at least one chosen search result. In a further preferred and non-limiting embodiment or aspect, the determining, by a processor, at least one chosen search result based at least partially on the at least one search term and/or the one or more selection of a subset of the plurality of subsets of the at least one related search break, includes: categorizing, by a processor, at least one search result of a plurality of search results based at least partially on the user data, wherein the plurality of search results is stored in a database and include more than one of the following: a product, a service, an activity, an interest, searchable information, or any combination thereof; and identifying, by a processor, the at least one chosen search result in response to determining that the at least one search result is categorized in both the at least one search term and the one or more selection of a subset of the plurality of subsets of the at least one related search break.

In one preferred and non-limiting embodiment or aspect, the at least one untitled search break is a plurality of search breaks. In another preferred and non-limiting embodiment or aspect, the shapes of the plurality of search breaks are concentric areas including circles, ellipses, squares, triangles, or any combination thereof.

In one preferred and non-limiting embodiment or aspect, provided is a computer-implemented method for providing a targeted search interface, the method including: generating, with a processor, a graphical user interface including at least one selectable option and at least one untitled search break; generating, with a processor and on the graphical user interface, in response to actuation of a second selectable option of the at least one selectable option, at least one titled search break and a prompt to a user to make at least one selection; and generating, with a processor and on another graphical user interface, in response to actuation of the at least one titled search break, a plurality of subsets of the at least one titled search break wherein a subset of the plurality of subsets of the titled search break has a relationship, such as a one-to-one relationship, with a predetermined group of users.

In one preferred and non-limiting embodiment or aspect, there is at least one predetermined group of users for at least one of the following: location, age, income, style, gender, or any combination thereof.

In one preferred and non-limiting embodiment or aspect, the method further includes: receiving, via user input, at least one search term and/or one or more selection of a subset of the plurality of subsets of the at least one titled search break; determining, by a processor, at least one chosen search result based at least partially on the at least one search term and/or the one or more selection of a subset of the plurality of subsets of the at least one titled search break, the at least one chosen search result including at least one of the following: a product, a service, an activity, an interest, searchable information, or any combination thereof; and displaying, on a visual display, the at least one chosen search result.

In one preferred and non-limiting embodiment or aspect, the receiving, via user input, at least one search term and/or one or more selections of at least one subset of the plurality of subsets of the subset of the at least one titled search break includes: (a) receiving, via user input, a subset of the plurality of subsets of the at least one titled search break; (b) displaying, on the graphical user interface or another graphical user interface, in response to a selection of a subset of the plurality of subsets of the titled search break, the at least one titled search break; (c) generating, with a processor and on the graphical user interface or another graphical user interface, in response to a next actuation of the at least one titled search break, a plurality of subsets of the at least one titled search break; and (d) repeating steps a through c until the user is finished making selections or no more selections can be made. In one preferred and non-limiting embodiment or aspect, the method further includes sharing, via a social media system, information related to a purchase or user selection of the chosen search result. In one preferred and non-limiting embodiment or aspect, the determining, by a processor, at least one chosen search result based at least partially on the at least one search term and/or the one or more selection of a subset of the plurality of subsets of the at least one titled search break includes: categorizing, by a processor, at least one search result of a plurality of search results based at least partially on the predetermined group of users, the plurality of search results including more than one of the following: a product, a service, an activity, an interest, searchable information, or any combination thereof; and identifying, by a processor, the at least one chosen search result in response to determining that the at least one search result is categorized in both the at least one search term and the one or more selection of a subset of the plurality of subsets of the at least one titled search break.

In one preferred and non-limiting embodiment or aspect, provided is a system for providing a computer-implemented targeted search interface including: a graphical user interface including at least one selectable option and at least one untitled search break; a database including a plurality of search results, the plurality of search results including more than one of the following: a product, a service, an activity, an interest, searchable information, or any combination thereof; and a processor, programmed or configured to, in response to actuation of the first selectable option of the at least one selectable option: (a) generate at least one related search break; (b) prompt the user to input user data; (c) receive, from the user, the user data; (d) generate, from the user data, a user profile; and (e) identify at least one group of related users based on at least the user profile; and, in response to actuation of the at least one related search break, (f) generate, on the graphical user interface or another graphical user interface, a plurality of subsets of the at least one related search break, wherein a subset of the plurality of subsets of the at least one related search break has a relationship, such as a one-to-one relationship, with a group of related users.

In one preferred and non-limiting embodiment or aspect, the processor is further programmed or configured to: receive, from the user, at least one search term and/or one or more selection of a subset of the plurality of subsets of the at least one related search break; determine at least one chosen search result based at least partially on the at least one search term and/or the one or more selection of a subset of the plurality of subsets of the at least one related search break, the at least one chosen search result including at least one of the following: a product, a service, an activity, an interest, searchable information, or any combination thereof; and generate, on the graphical user interface, the at least one chosen search result. In one preferred and non-limiting embodiment or aspect, the processor is further programmed or configured to (g) receive, via a user input, a subset of the plurality of subsets of the at least one related search break; (h) display, on the graphical user interface or another graphical user interface, in response to a selection of a subset of the plurality of subsets of the related search break, the at least one related search break; (i) generate, on the graphical user interface or another graphical user interface, in response to a next actuation of the at least one related search break, a plurality of subsets of the at least one related search break; and (j) repeat steps g through i until the user is finished making selections or no more selections can be made.

In one preferred and non-limiting embodiment or aspect, the at least one untitled search break is a plurality of search breaks. In another preferred and non-limiting embodiment or aspect, the shapes of the plurality of search breaks are concentric areas including circles, ellipses, triangles, squares, or any combination thereof.

In one preferred and non-limiting embodiment or aspect, the processor is further programmed or configured to: (k) categorize at least one search result of the plurality of search results based at least partially on the user data; and (l) identify at least one chosen search result in response to determining that the at least one search result is categorized in both at least one search term and at least a subset of the plurality of subsets of the at least one related search break.

In one preferred and non-limiting embodiment or aspect, provided is a system for providing a computer-implemented targeted search interface including: a graphical user interface including at least one selectable option and at least one untitled search break; a database including a plurality of search results, the plurality of search results including more than one of the following: a product, a service, an activity, an interest, searchable information, or any combination thereof; and a processor, programmed or configured to, in response to actuation of a second selectable option of the at least one selectable option: (a) generate, on the graphical user interface, at least one titled search break; (b) prompt the user to make at least one selection; (c) receive, from the user, at least one search term and/or a selection of at least a subset of the at least one titled search break; (d) determine at least one chosen search result based at least partially on the at least one search term and/or the at least a subset of the at least one titled search break, the at least one chosen search result including at least one of the following: a product, a service, an activity, an interest, searchable information, or any combination thereof; and (e) generate, on the graphical user interface, the at least one chosen search result; and in response to actuation of the at least one titled search break; (f) generate, a plurality of subsets of the at least one titled search break wherein a subset of the plurality of subsets of the titled search break has a relationship, such as a one-to-one relationship, with a predetermined group of users. In one preferred and non-limiting embodiment or aspect, the processor is further programmed or configured to perform the following steps: (g) receive, via user input, a subset of the plurality of subsets of the at least one titled search break; (h) display, on the graphical user interface or another graphical user interface, in response to a selection of a subset of the plurality of subsets of the titled search break, the at least one titled search break; (i) generate, on the graphical user interface or another graphical user interface, in response to a next actuation of the at least one titled search break, a plurality of subsets of the at least one titled search break; and (j) repeat steps g through i until the user is finished making selections or no more selection can be made.

In one preferred and non-limiting embodiment or aspect, there is one predetermined group of related users for at least one of the following: location, age, income, style, gender, or any combination thereof.

In one preferred and non-limiting embodiment or aspect, the processor is further programmed or configured to: (k) categorize at least one search result of the plurality of search results based at least partially on the predetermined group of users, wherein the search results are stored in a database; and (l) identify the at least one chosen search result in response to determining that the at least one search result is categorized in both the at least one search term and the at least a subset of the at least one titled search break.

In one preferred and non-limiting embodiment or aspect, the processor is further programmed or configured to share, via a social media outlet, a purchase or user selection of the at least one chosen search result.

In one preferred and non-limiting embodiment or aspect, provided is a computer-implemented method, a system, and/or a computer program product programmed or configured to implement and/or facilitate one or more of the processing steps described hereinabove.

In one preferred and non-limiting embodiment or aspect, the at least one chosen search result may be chosen from a subset of search results having a relationship to at least one other user in a social network comprising at least one social connection to a user. The at least one chosen search result may also be chosen from a subset of search results having at least one attribute in common with a set of user-selected criteria representative of desired user characteristics.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Further features and other objects and advantages will become apparent from the following detailed description made with reference to the drawings in which.

DETAILED DESCRIPTION OF THE INVENTION

Figure 1:
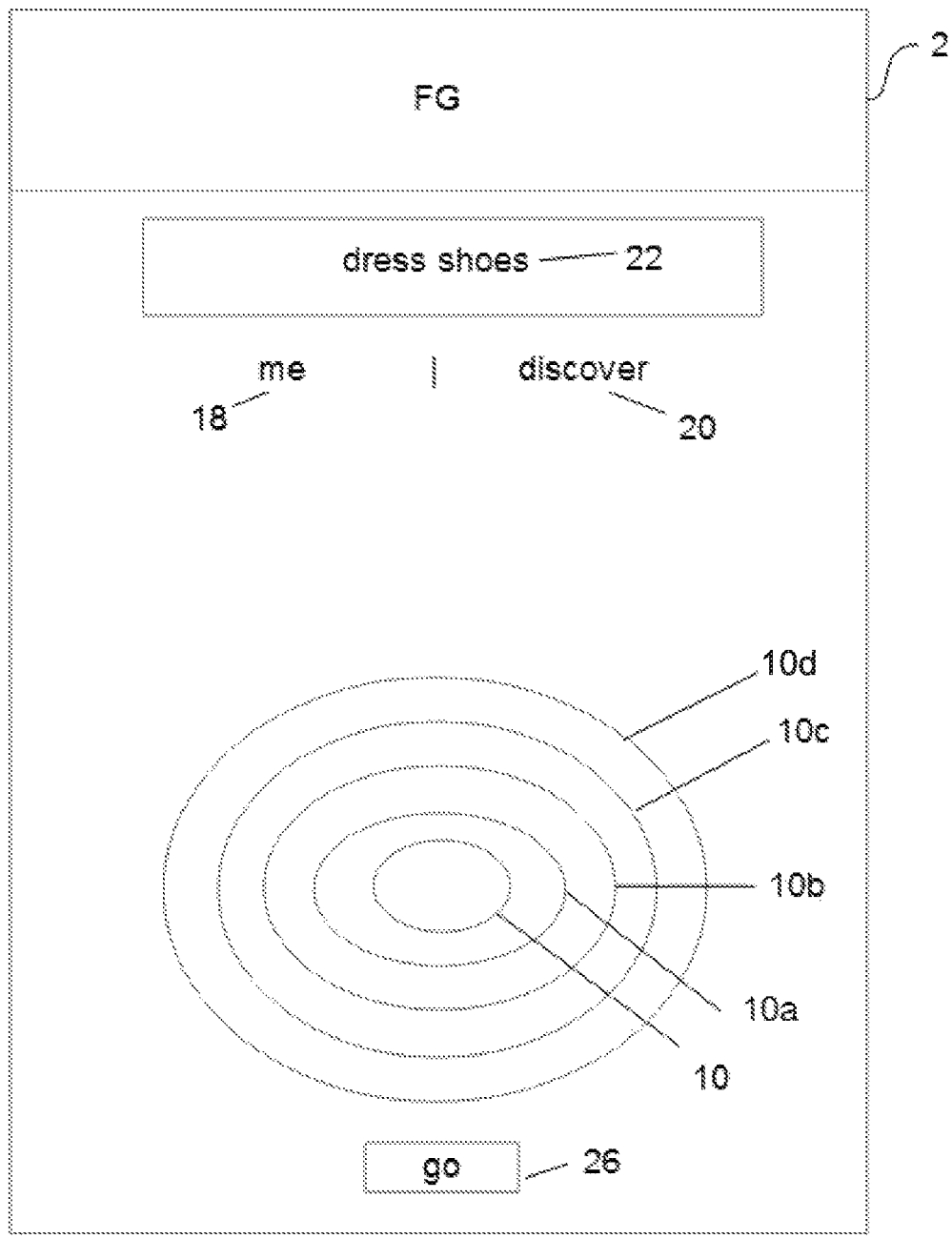
FIG. 1 illustrates a graphical user interface used in connection with one non-limiting embodiment of a system and method for providing results based on user-selected search breaks according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary configurations of the invention. Hence, specific dimensions and other physical characteristics related to the configurations disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

In a preferred and non-limiting embodiment of the present invention, provided is a system and method for providing search results based on user-selected search breaks and/or user-inputted search terms. To begin searching, the user can select the mode in which they want to search, for example, "me" or "discover." In the "me" mode, the user may input user data, which can form a user profile, such that the resulting related search breaks are representative of groups of related users that are based on, e.g., connected in a social network to, the user profile. In the "discover" mode, the resulting search breaks can be titled search breaks, where the titled search breaks are representative of predetermined groups of users, e.g., users with desired traits or characteristics, such as with a specified age, gender, location, income, style, etc. In either mode, search results (e.g., products, services, activities, interests, and/or the like) can be organized such that they fall into one or more of either groups of related users or predetermined groups of users, which in turn correspond to the resulting subset of the search break, i.e., subset of related search break, and/or subset of titled search break, respectively. Then, as the user selects one or more of the resulting subsets of the search breaks in either mode and/or at least one search term is inputted by the user, the resulting chosen search result(s) is present in all of the corresponding groups to the selected subset of the search break categories, related to the at least one search term, or both. Thus, as more search breaks are selected, the chosen search result(s) becomes more specific and tailored since the chosen search result(s) may fall into each of the multiple selected subsets of the search breaks. Conversely, if fewer subsets of the search breaks are selected, the search result(s) will be less specific since the chosen search result(s) only need to fall into fewer categories corresponding to the selected search break. In this manner, the invention employs a new design to enable users to easily size up or down the database from which a specific search is pulling results. For example, a user who searches for "blue shoes," can easily search for "blue shoes" from: (1) results from the entire "database universe" (which may include men/women, all ages, all income levels, and all cities and countries); (2) narrow the search for "blue shoes" relevant to women who live in New York, are affluent, are over 45 years old, and favor a classic style; or (3) change the search to pull results for "blue shoes" only from people who are in the user's actual social network. It will be appreciated that other configurations are possible.

Referring to FIG. 1, a graphical user interface 2 is shown according to a preferred and non-limiting embodiment or aspect. The graphical user interface 2 includes untitled search breaks 10, 10a, 10b, 10c, 10d, a first selectable option 18, a second selectable option 20, and a third selectable option 26. The untitled search breaks 10-10d can be displayed on the graphical user interface 2, such that none of the untitled search breaks 10-10d have titles. However, it will be appreciated that, in other non-limiting embodiments or aspects, the search breaks 10-10d may have titles. The first selectable option 18 may be labeled "ME," the second selectable option 20 may be labeled "DISCOVER," and the third selectable option 26 may be labeled "GO," as examples, and the user selection of one of the selectable options 18, 20 is used by a processor to determine, for example, in which mode the processor will execute and what titles are assigned to the untitled search breaks 10-10d. In a preferred and non-limiting embodiment or aspect, the untitled search breaks may be colored, which may be the same or different colors for each search break. The untitled search breaks can be animated on the graphic user interface. For example, the untitled search breaks may pulse and/or illuminate when a user scrolls over them. In another preferred and non-limiting embodiment or aspect, the plurality of search breaks are the same shape, such as circles, and are scattered across the graphical user interface. In another preferred and non-limiting embodiment or aspect, the plurality of search breaks can be combined together by the user, such that when they are combined, the characteristics change, e.g., the color, shape or size of the resulting search break can change. For example, if a red and yellow search break is combined, the resulting search break may be orange. The search breaks may also be employed on the image of a globe, incorporating other pictures and/or graphical representations to indicate narrower selectable attributes, such as age, income, style, and/or the like. It will be appreciated that many other configurations are possible.

Figure 2A:
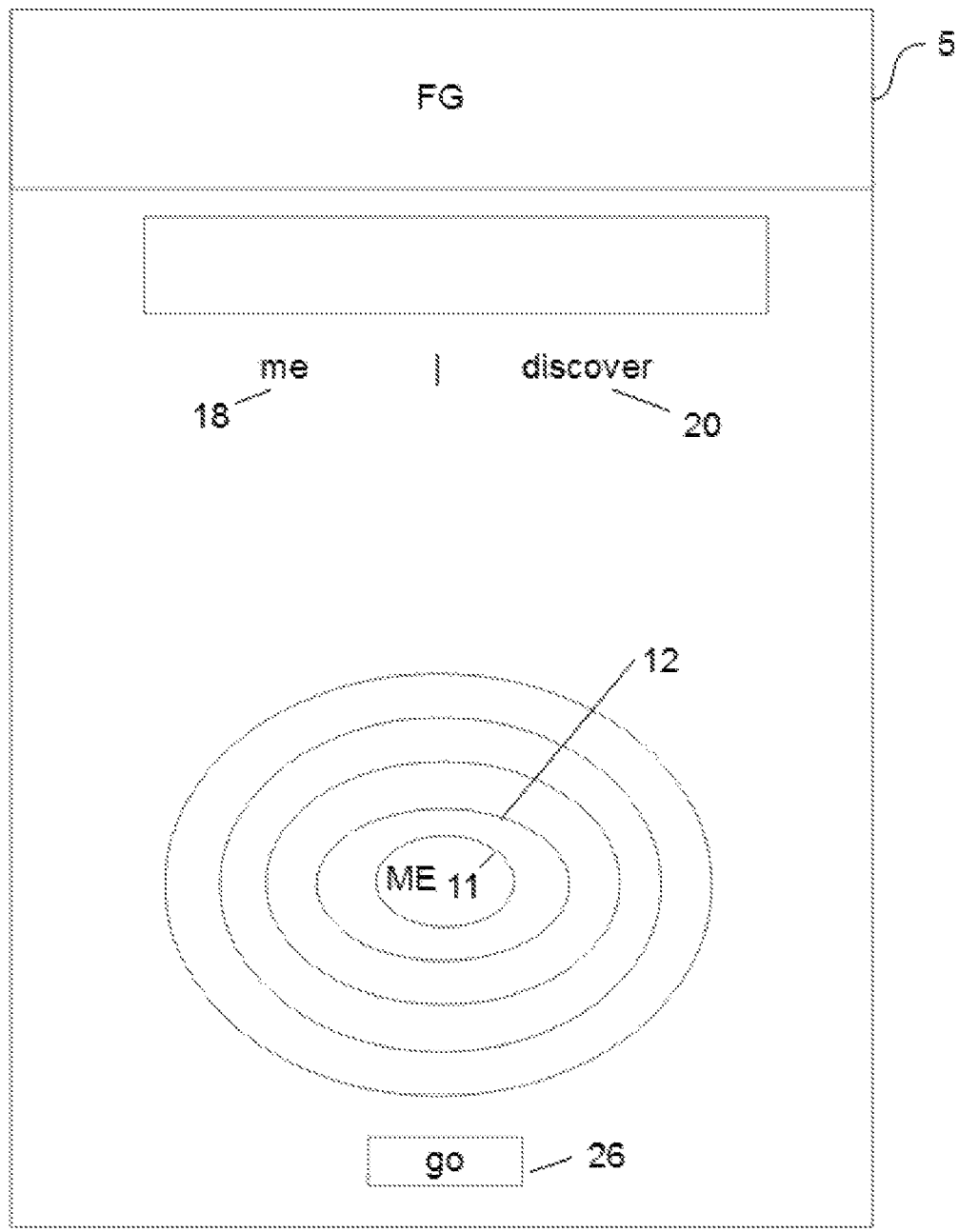
FIG. 2A illustrates a graphical user interface used in connection with one non-limiting embodiment of a system and method for providing results based on user-selected search breaks according to the principles of the present invention.
Figure 2B:
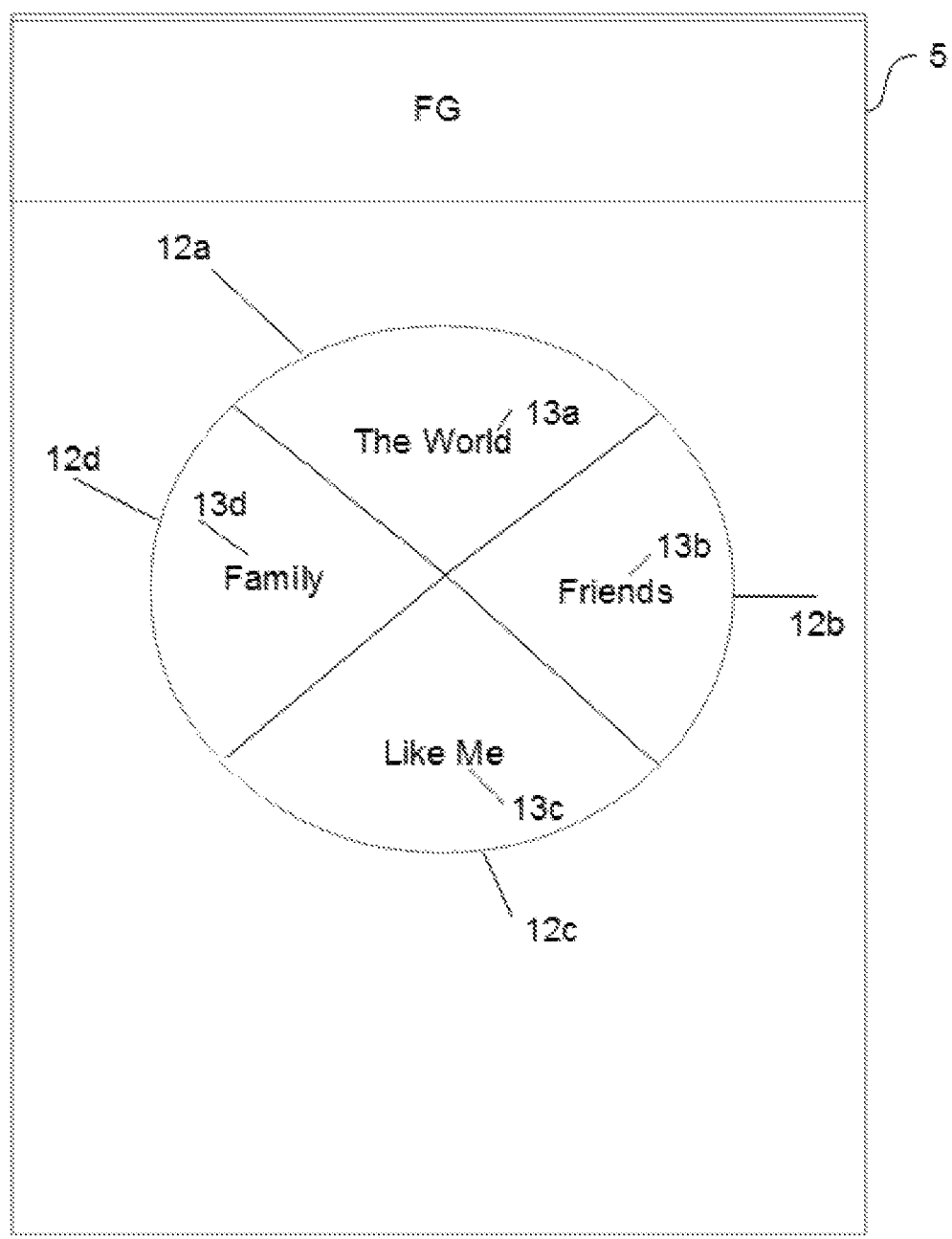
FIG. 2B illustrates a graphical user interface used in connection with one non-limiting embodiment of a system and method for providing results based on user-selected search breaks according to the principles of the present invention.

Now referring to FIG. 2A, a further graphical user interface 5 is shown according to another preferred and non-limiting embodiment or aspect. In response to a user selection of the first selectable option 18, the processor can prompt the user to input user data (not shown in FIG. 2A). The user input data can represent, for example, at least one of the following: age, gender, location, income, style, product type, service type, a search category, a parameter, a criterion, a keyword, natural language input, or any combination thereof. This user data can be used by the processor to create a user profile. The user profile can be used by the processor to create an individual user 11, where the individual user 11 represents only the person associated with the user profile and can be titled "ME." With reference to FIG. 2B, the user profile can be used by the processor to create groups of related users 13a, 13b, 13c, 13d, where the groups of related users 13a, 13b, 13c, 13d have a relationship (e.g., a one-to-one relationship) with a plurality of subsets of the related search break 12 (shown in FIG. 2A), as shown in FIG. 2B as 12a, 12b, 12c, 12d, respectively. As shown across FIGS. 1-2B, the untitled search breaks 10 and 10a from FIG. 1 may correspond to related search breaks 11 and 12, and in response to a user selection of related search break 12, the plurality of subsets 12a, 12b, 12c, 12d are generated, such that a user can select one or more subsets of the plurality of subsets. As an example, if the user profile includes a 25-year old female who lives in Los Angeles, Calif., one group of related users 13c could include other females in the age range of 18-25 who live in the California area and can be titled "LIKE ME." The group of related users 13c has a one-to-one relationship with the subset of a related search break 12c. Another group of related users 13d could include family members, as determined by the user profile, and may correspond to a subset of a related search break 12d, titled "FAMILY," as an example.

Figure 2C:
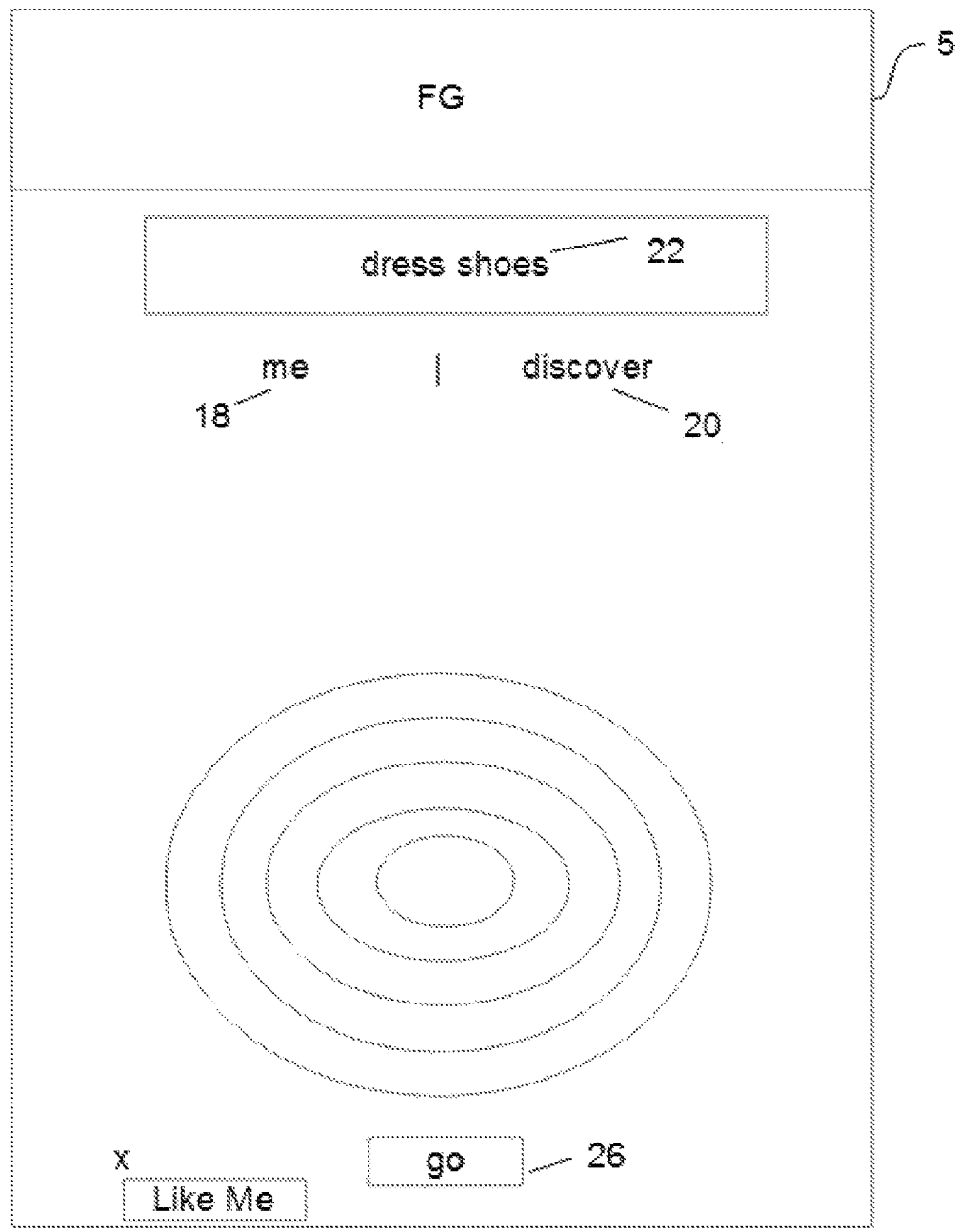
FIG. 2C illustrates a graphical user interface used in connection with one non-limiting embodiment of a system and method for providing results based on user-selected search breaks according to the principles of the present invention.

Referring now to FIG. 2B, the user can select one or more of the subsets of a related search break 12a, 12b, 12c, 12d to tailor the search to search only within the selected subsets. For example, a user may select the subset of a related search break 12c titled "LIKE ME." As shown in FIG. 2B, if a user selects the group of related users 13c, then the search will be tailored to the search results (e.g., products, services, activities, interests, and/or the like) or data found in the "LIKE ME" subset. "LIKE ME" may be displayed on the graphical user interface to allow the user to know what filters have been applied, as shown in FIG. 2C. An "X" (shown in FIG. 2C) or other selectable option may also be present and tied to the chosen subset, such that when the user selects the "X," the subset is deleted and no longer applied. As more selections are made by the user, further displays may be shown on the graphical user interface so that the user can see what subsets have been applied. Then, the user can input a search term 22, for example "dress shoes" (as shown in FIG. 2C), for conducting a search, and select the third selectable option 26. The processor could then search through the database for search results (e.g., products, services, activities, interests, and/or the like) 23-23g (for example, see FIG. 4A) specific to the search term 22 that are within the group of the selected subset of a related search break 12c (not shown). As an example, a user may select the subset of a related search break 12b titled "FRIENDS." Then, the user can input a search term 22, for example "spas" (not shown), for conducting a search, and select the third selectable option 26. The processor could then search through the database for search results 23-23g specific to the search term 22 that are within the group of the selected subset of a related search break 12c (not shown). In one example, the user may input the search term 22, e.g., "best Hotels in Hawaii", while having selected a subset of a related search break 12c (not shown). Thus, the processor could search through the database for search results 23-23g specific to search term 22, e.g., "best Hotels in Hawaii", that are within the group of the selected subset of a related search break 12c (not shown) that could, for example, include search results purchased or selected by other users "LIKE ME" (e.g., similar to the user) that have stayed at hotels in Hawaii.

Now referring to FIGS. 3A-3F, a further graphical user interface 7 is shown according to a preferred and non-limiting embodiment or aspect. In response to a user selection of the second selectable option 20, the processor can generate and display titled search breaks 50, 100, 150, 200, 250, where predetermined groups of users 55a, 55b, 105a, 105b, 105c, 105d, 155a, 155b, 155c, 155d, 205a, 205b, 205c, 205d, 255a, 255b, 255c, 255d have a relationship (e.g., a one-to-one relationship) with the subsets of titled search breaks 50a, 50b, 100a, 100b, 100c, 100d, 150a, 150b, 150c, 150d, 200a, 200b, 200c, 200d, 250a, 250b, 250c, 250d, respectively, as shown, for example, in FIGS. 3A-3F.

Figure 3A:
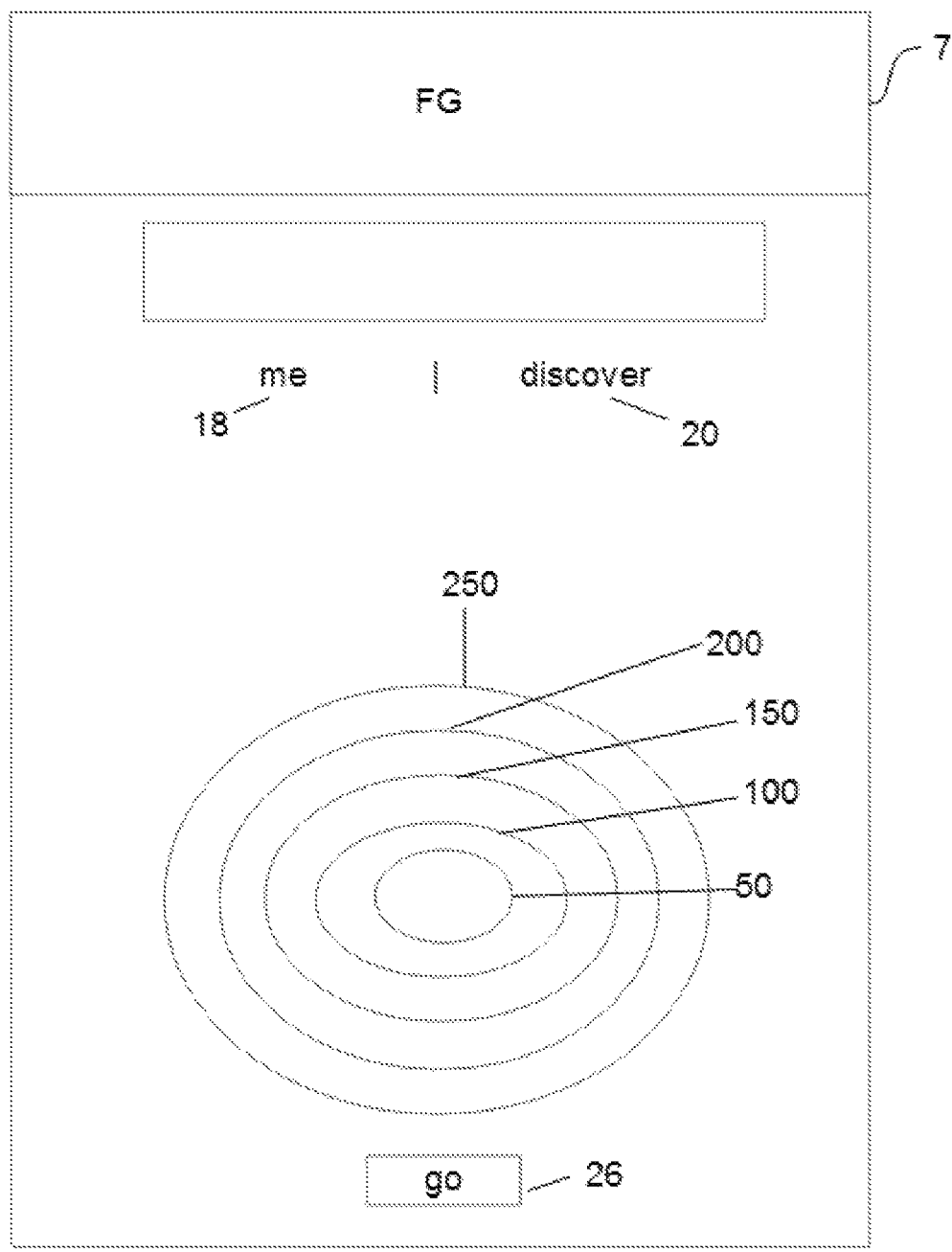
FIG. 3A illustrates another graphical user interface used in connection with one non-limiting embodiment of a system and method for providing results based on user-selected search breaks according to the principles of the present invention.
Figure 3B:
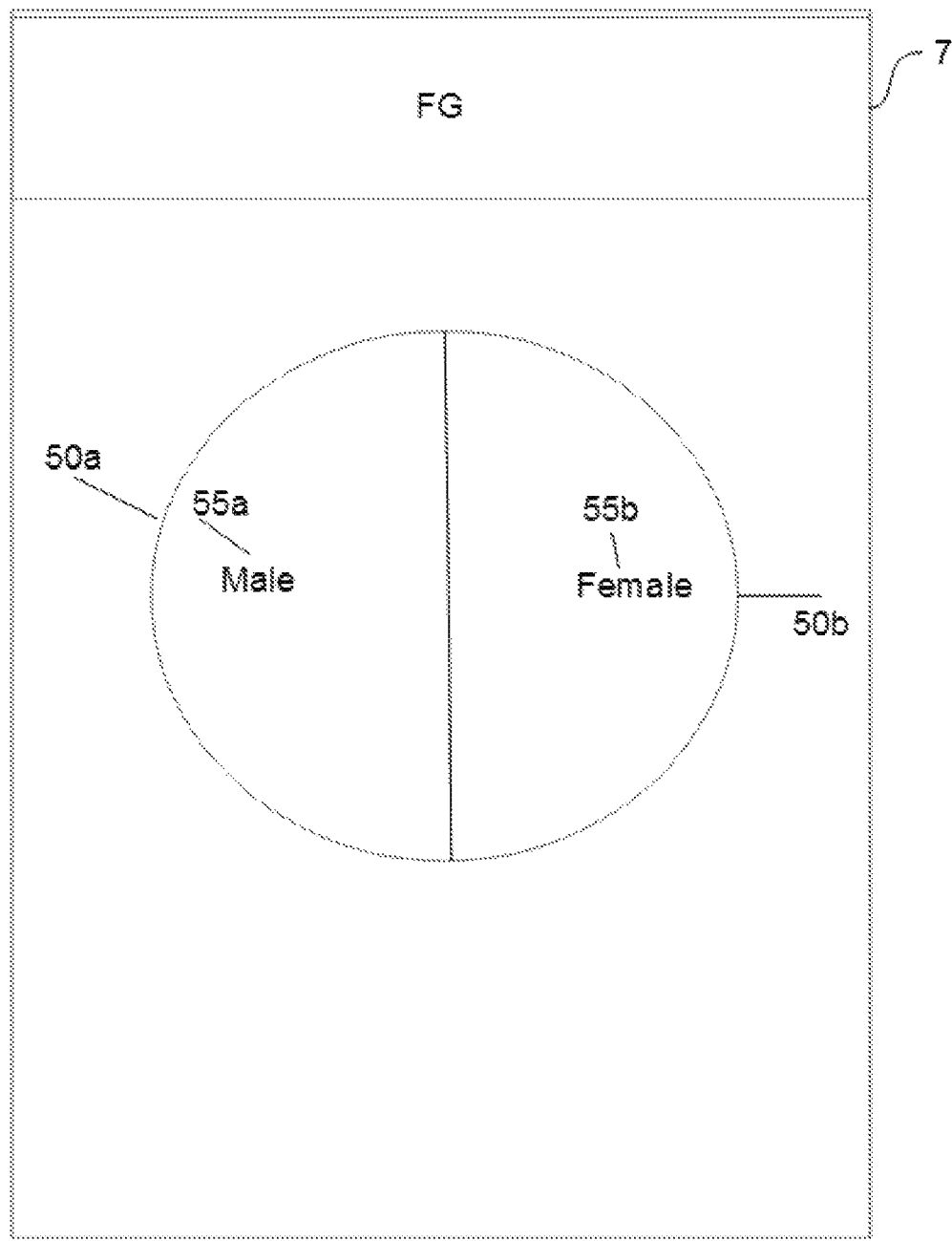
FIG. 3B illustrates a graphical user interface used in connection with one non-limiting embodiment of a system and method for providing results based on user-selected search breaks according to the principles of the present invention.
Figure 3C:
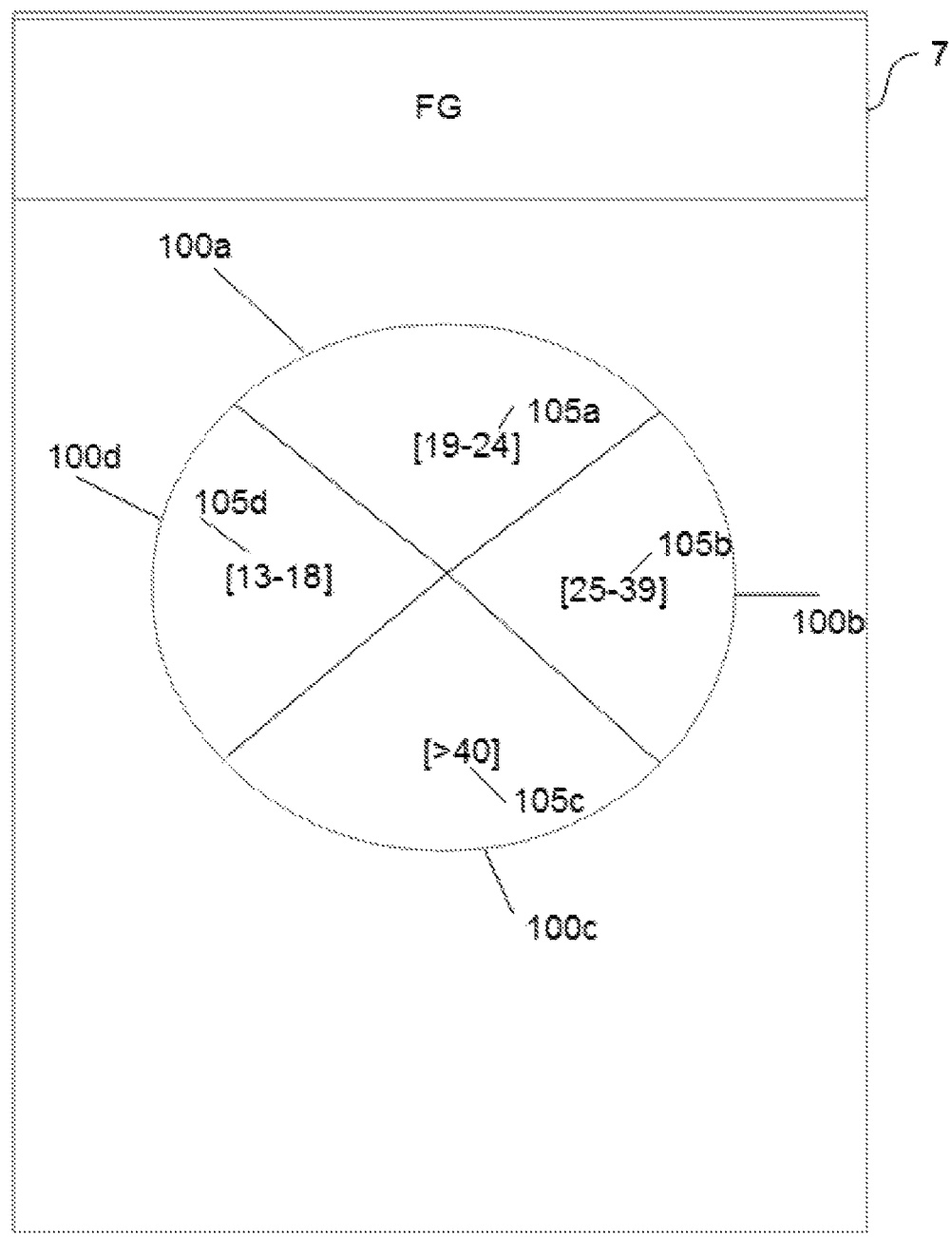
FIG. 3C illustrates a graphical user interface used in connection with one non-limiting embodiment of a system and method for providing results based on user-selected search breaks according to the principles of the present invention.
Figure 3D:
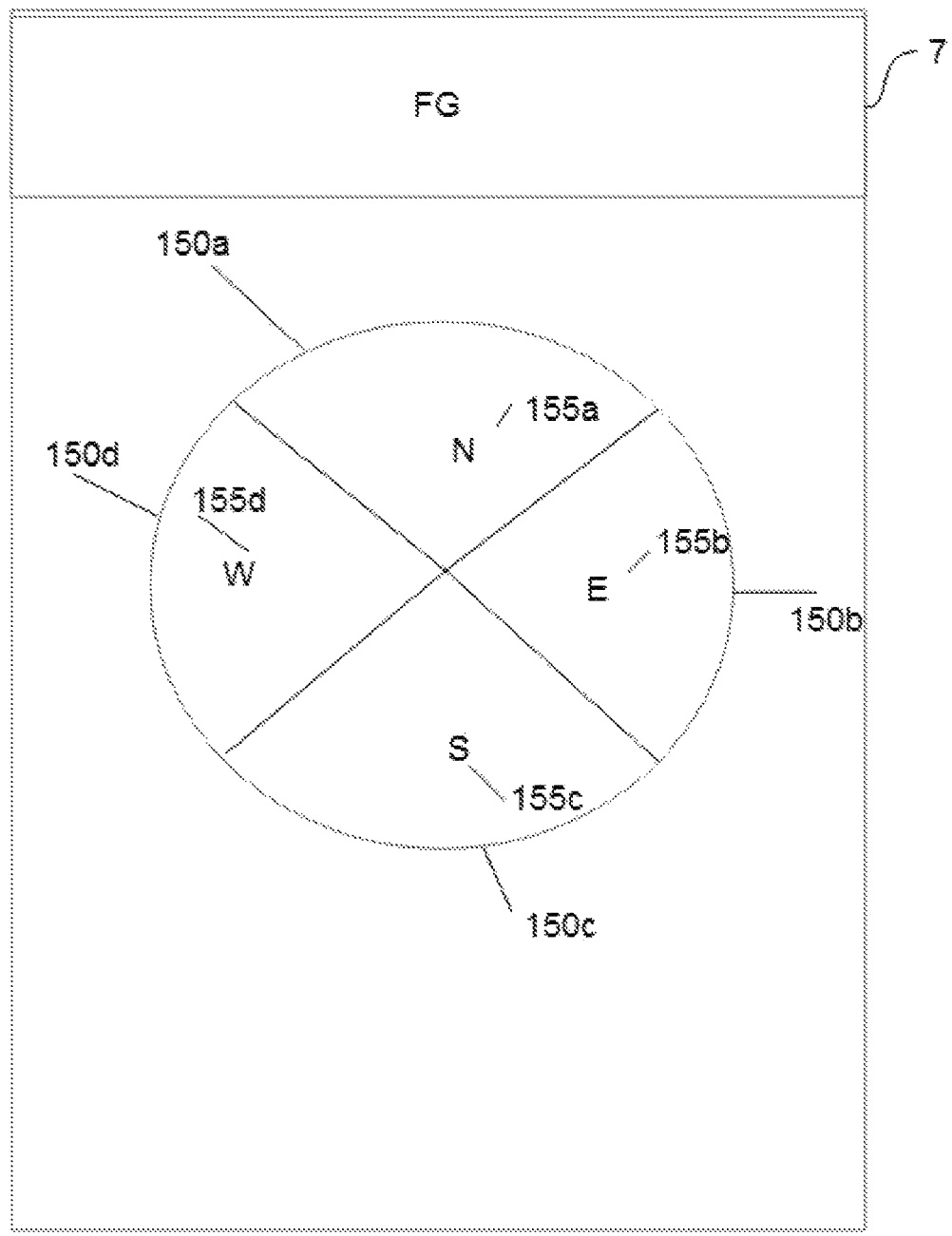
FIG. 3D illustrates a graphical user interface used in connection with one non-limiting embodiment of a system and method for providing results based on user-selected search breaks according to the principles of the present invention.
Figure 3E:
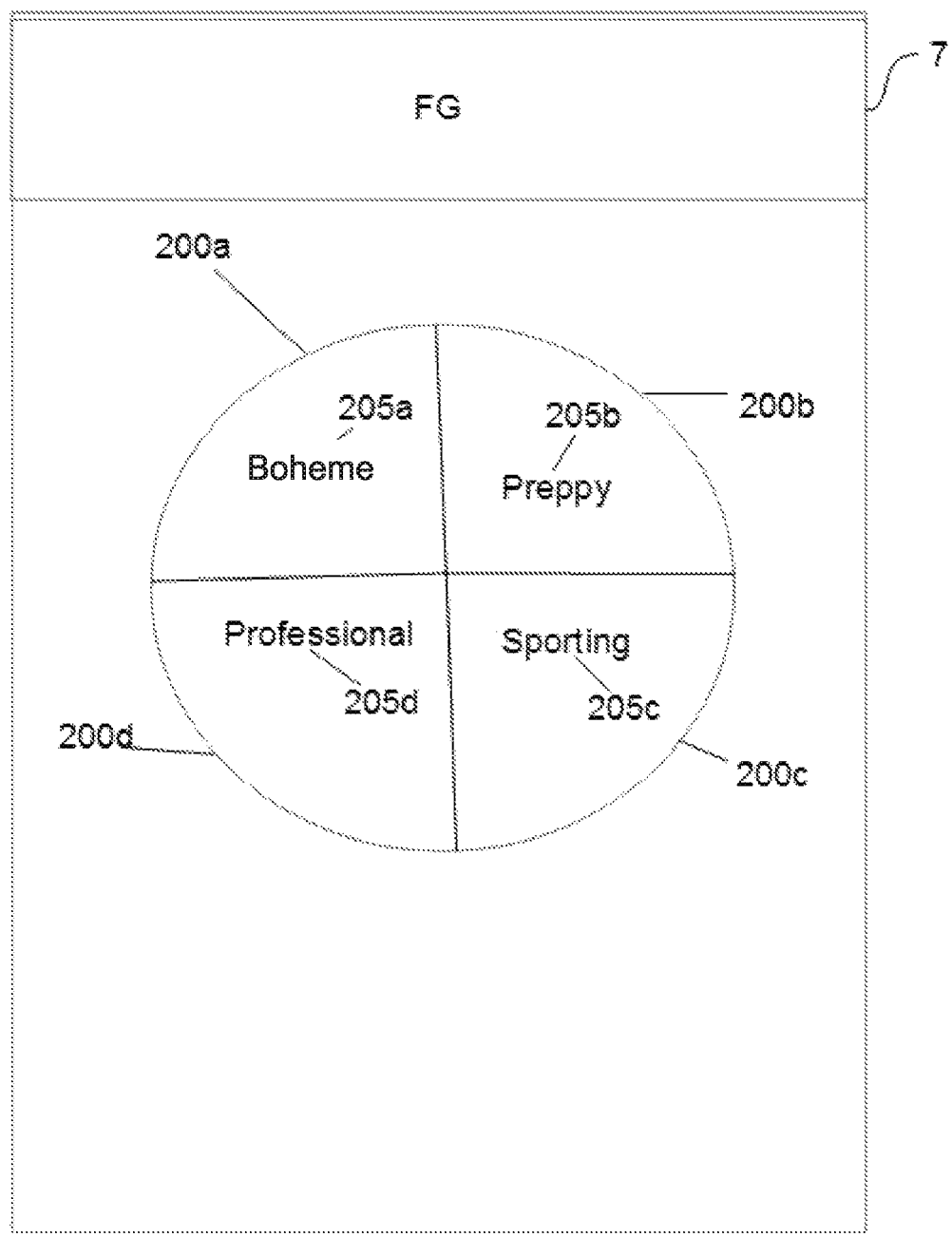
FIG. 3E illustrates a graphical user interface used in connection with one non-limiting embodiment of a system and method for providing results based on user-selected search breaks according to the principles of the present invention.
Figure 3F:
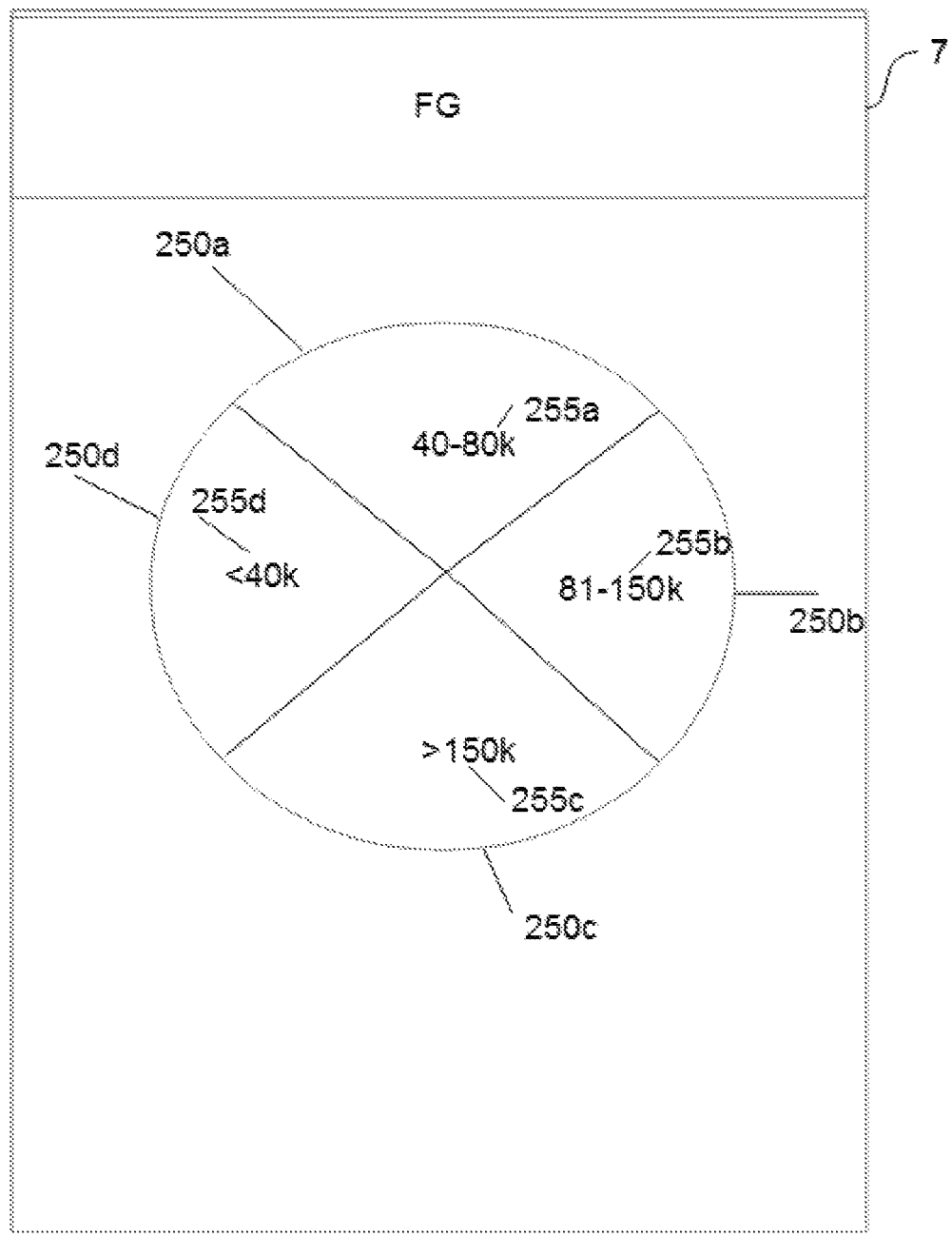
FIG. 3F illustrates a graphical user interface used in connection with one non-limiting embodiment of a system and method for providing results based on user-selected search breaks according to the principles of the present invention.

As a non-limiting example, predetermined groups of users 55a and 55b have a one-to-one relationship with subsets of titled search breaks 50a and 50b of the titled search break 50, respectively. As shown in FIGS. 3A-3B, titled search break 50 can be titled "Gender" and the subsets of titled search break 50a, 50b of titled search break 50 correspond to the predetermined groups of related users 55a (titled "Male") and 55b (titled "Female"), respectively. In another non-limiting example shown in FIGS. 3A and 3C, titled search break 100 can be titled "Age" and the subset of a titled search break 100a, 100b, 100c, 100d of titled search break 100 correspond to predetermined age groups of users 105*a* (titled "19-24"), 105*b* (titled "25-39"), 105*c* (titled "40+"), and 105*d* (titled "13-18"), respectively. In another non-limiting example shown in FIGS. 3A and 3D, titled search break 150 can be titled "Region" and the subset of titled search break 150*a*, 150*b*, 150*c*, 150*d* of titled search break 150 correspond to predetermined regional groups of users 155*a* (titled "N"), 155*b* (titled "E"), 155*c* (titled "S"), and 155*d* (titled "W"), respectively. In a further non-limiting example shown in FIGS. 3A and 3E, titled search break 200 can be titled "Style" and the subset of titled search break 200*a*, 200*b*, 200*c*, 200*d* of titled search break 200 correspond to predetermined style groups of users 205*a* (titled "Boheme"), 205*b* (titled "Preppy"), 205*c* (titled "Sporting"), and 205*d* (titled "Professional"), respectively. In a still further non-limiting example shown in FIGS. 3A and 3F, titled search break 250 can be titled "Income" and the subset of a titled search break 250*a*, 250*b*, 250*c*, 250*d* of titled search break 250 correspond to predetermined income groups of users 255*a* (titled "40-80 k"), 255*b* (titled "81-150 k"), 255*c* (titled ">150 k"), and 255*d* (titled "<40 k"), respectively. It will be appreciated that many configurations are possible.

If a user selects a titled search break, then the graphical user interface 7 may prompt the user to make a selection from one of the subsets of the selected titled search breaks (not shown). As an example, if a user selects titled search break 50, then graphical user interface will generate the subsets of titled search breaks 50*a* and 50*b*, as shown in FIG. 3B, such that the user can select 50*a* and/or 50*b* to tailor the data or search result(s) that are selected by the search. Thus, when a user selects one or more of a subset of the titled search break 50*a*-250*d*, which relates to a predetermined group of users 55*a*-250*d*, the search is tailored to the search results 23-23*g* that fall within the selected predetermined group of users (discussed later). The search may further be tailored if a search term 22 is entered to those search results specific to the search term 22 (not shown). The titles and examples of the predetermined groups of users are examples and are not meant to be construed in a limiting sense. For example, the titles can be interactive pictures or displays, e.g., a globe for location, which the user can select. With specific reference to an interactive globe for selecting location, the interface may be configured to allow a user to rotate, move, zoom in, or otherwise manipulate the globe in order to choose a location. It will be appreciated that many other configurations are possible.

Figure 4A:
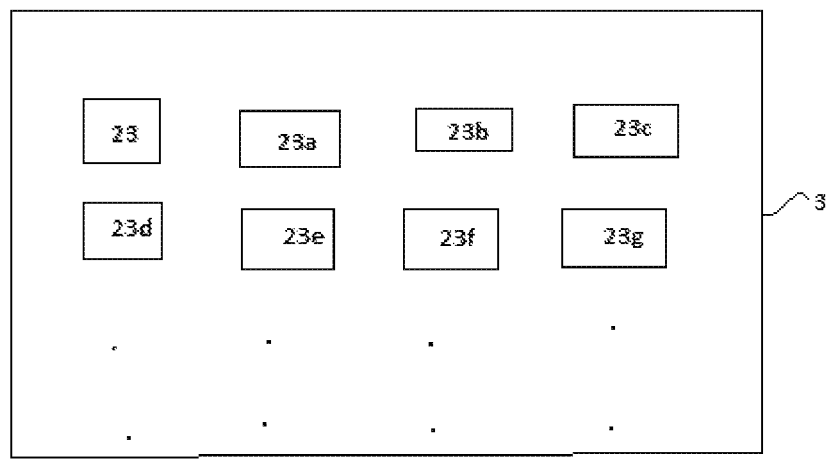
FIG. 4A illustrates an example of a database used in connection with one non-limiting embodiment of a system and method for providing results based on user-selected search breaks according to the principles of the present invention.
Figure 4B:
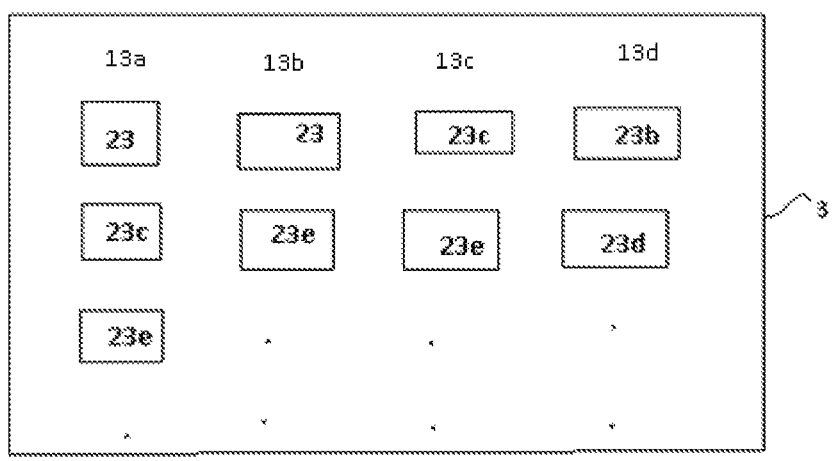
FIG. 4B illustrates a non-limiting example of a configuration of the database of FIG. 4A used in connection with one embodiment of a system and method for providing results based on user-selected search breaks according to the principles of the present invention.

Now referring to FIG. 4A, shown is a database 3 according to a preferred and non-limiting embodiment or aspect where the database 3 includes search results (e.g., products, services, activities, interests, and/or the like) 23-23*g*. Now referring to FIG. 4B and in one non-limiting example, when executing in the user-selected first actuator mode, the processor can categorize the search results 23-23*g* into one or more of the groups of related users 13*a*-13*d* so that, when searching the database 3 based on either the search term 22, the selected subsets of related search breaks, or both, the processor selects the search result(s) 23-23*g* that fall within each of the groups of related users that correspond to the selected subsets of related search breaks and the search term 22, if entered. For example, if no search term 22 was entered, but subsets of related search breaks were selected, the processor will search in the database for search results that match the selected subsets of related search breaks. However, if no subsets of related search breaks were selected but a search term 22 was entered, the processor will search the database for search results that relate to the entered search term 22 (not shown).

Figure 4C:
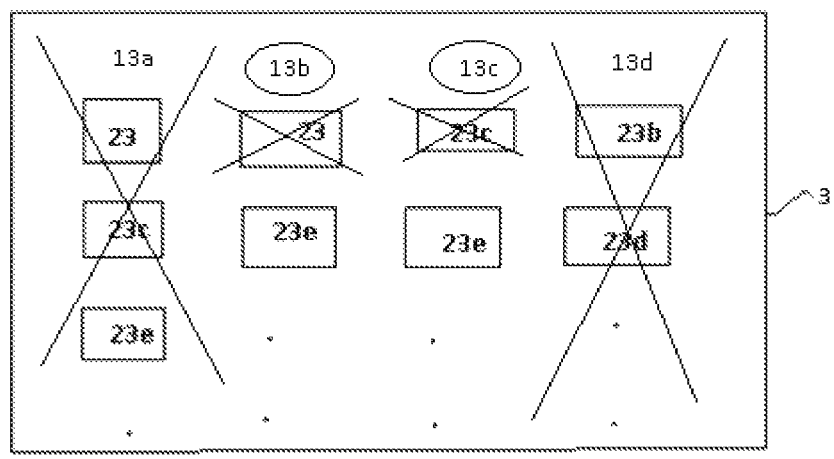
FIG. 4C further illustrates the non-limiting example shown in FIG. 4B.
Figure 4D:
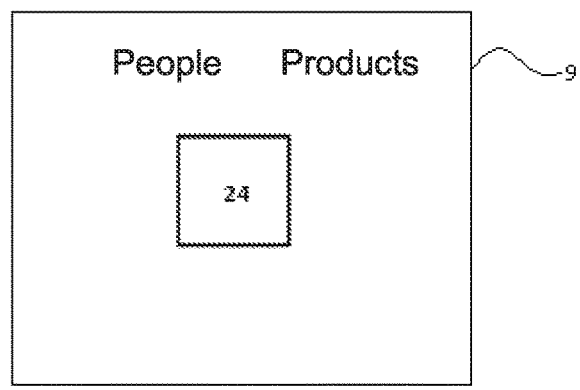
FIG. 4D illustrates another graphical user interface used in connection with one non-limiting embodiment of a system and method for providing results based on user-selected search breaks according to the principles of the present invention.

Now referring to FIG. 4C, if a user selects subsets of related search break 13*b* and 13*c* (not shown), then the resulting search results will be the search results that are common amongst those selections, e.g., the only search result 23*e*. Now referring to FIG. 4D, the graphical user interface 9 can display information or data directed to the chosen search result 24 that corresponds to search result 23*e*, which represents the search result that was common amongst the user selections of FIG. 4C. Further, if the user decides to purchase or select one of the chosen search results, the user can share the related purchasing information or search result information through use of a social network system (not shown). It should be understood that this is an example and not meant to be construed in a limiting sense. The database 3 may be populated with a plurality of search results (e.g., products, services, activities, interests, and/or the like), which may include a variety of types of information or areas of interest of different levels, which may be separated into one or more of the groups of related users. The search results can include any type of searchable data, including, but not limited to, destinations, hotels, clothes, consumer items, electronics, toys, games, restaurants, food items, social organizations, online products, online services, stores, websites, etc. The search results may include other types of information or interests, such as, but not limited to books, articles, research papers, hobbies, the arts, sports, and other forms of activities or interests. The processor can search the database across and among the differing predetermined groups of users or groups of related users, depending on the mode, and can run in either user-selectable mode. The processor can also use a user-inputted search term 22 to determine which search results are related to that search term 22.

Figure 4E:
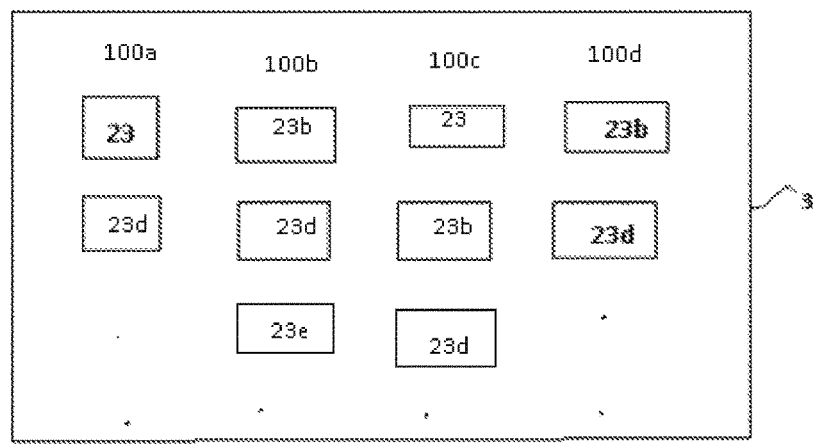
FIG. 4E illustrates another example of a configuration of the database of FIG. 4A used in connection with another non-limiting embodiment of a system and method for providing results based on user-selected search breaks according to the principles of the present invention.
Figure 4F:
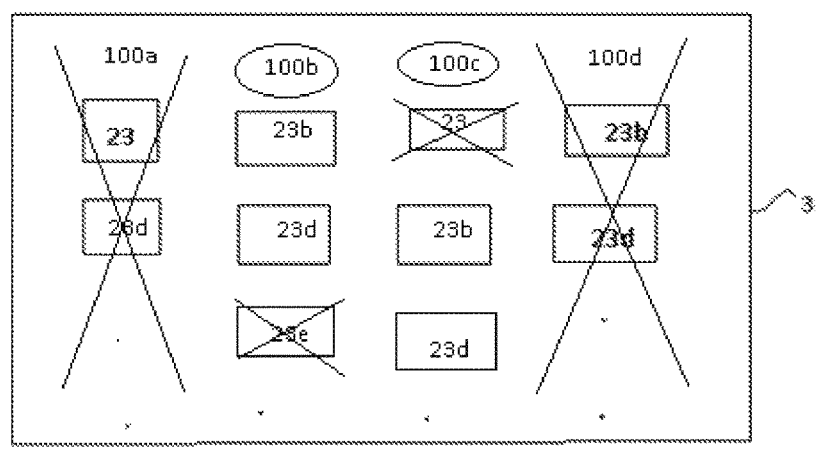
FIG. 4F further illustrates the non-limiting example shown in FIG. 4E.

Now referring to FIGS. 4E-4F, shown is another example of the configuration of the database 3 according to a preferred and non-limiting embodiment or aspect. Referring to FIG. 4E, when being executed in the user-selected second actuator mode, the processor can categorize the search results 23-23*g* from FIG. 4A into one or more of the groups of related users so that, when searching the database 3 based on the search term 22, the selected subsets of related search breaks, or both, the processor selects the search results 23-23*g* that fall within each of the groups of related users that correspond to the selected subsets of related search breaks 100*a*, 100*b*, 100*c*, 100*d* and the search term 22, if entered (not shown). For example, if no search term 22 was entered, but subsets of related search breaks were selected, the processor will search in the database for search results that match up with the selected subsets of related search breaks. However, if no subsets of related search breaks were selected but a search term 22 was entered, the processor will search the database 3 for search results that relate to the entered search term 22 (not shown).

In one example, and referring to the non-limiting example shown in FIG. 4E, the search results 23-23*g* can be separated into sections according to predetermined subsets of search breaks 100*a*-100*d*. Now referring to FIG. 4F, if a user selects subsets of related search breaks 100*b* and 100*c* (not shown), then the resulting search results are the search results that are common amongst those selections, i.e., search results 23*b* and 23*d*. It should be understood that this is an example and not meant to be construed in a limiting sense. The database 3 can have many search results of different levels. The search results can include various parameters and types of data. The processor can search the database 3 across and among the differing predetermined groups of users or groups of related users, depending on the mode, and can run in either user selectable mode. The processor can also use a user-inputted search term to determine which search results are related to that search term 22.

Figure 4G:
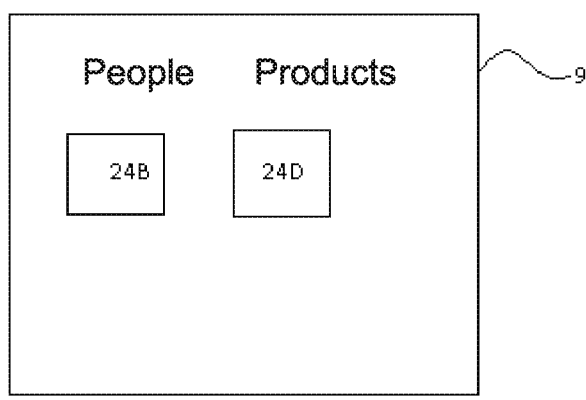
FIG. 4G illustrates another graphical user interface used in connection with another non-limiting embodiment of a system and method for providing results based on user-selected search breaks according to the principles of the present invention.

Now referring to the non-limiting example shown in FIG. 4G, a graphical user interface 9 can display the chosen search results 24B and 24D, which correspond directly to search results 23b and 23d, the common search results of FIG. 4F. Then, if the user decides to purchase or select one of the chosen search results 24B, 24D, the user can share the related purchasing information or search result information through use of a social network system (not shown).

Figure 5:
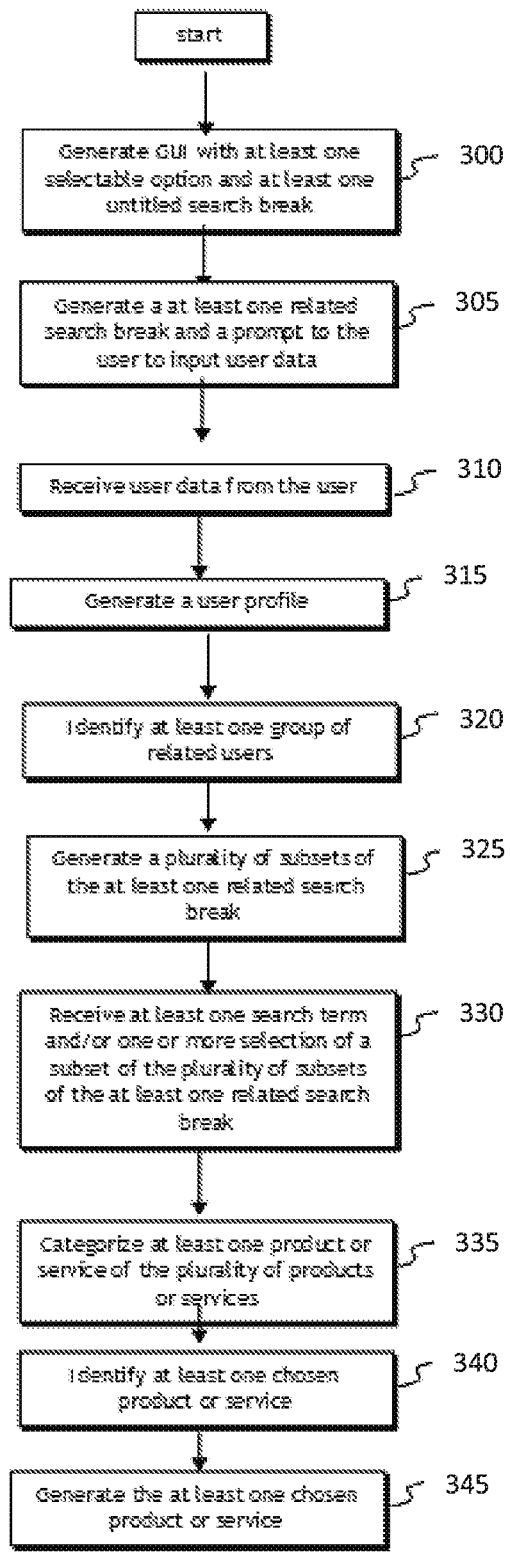
FIG. 5 illustrates a flow diagram for one non-limiting embodiment of a method for providing results based on user-selected search breaks according to the principles of the present invention.

Now referring to FIG. 5, a method for providing search results based on user-selected search breaks is shown according to a preferred and non-limiting embodiment or aspect. At first step 300, a graphical user interface with at least one selectable option and at least one untitled search break is generated by a processor. At step 305, in response to selection of a first selectable option, the processor generates at least one related search break and a prompt to the user to input user data. At step 310, the processor receives user data from the user. This user data can include, for example, at least one of the following: age, gender, location, income, style, product type, service type, a search category, a parameter, a criterion, a keyword, natural language input, marital status, profession, avocation, or any other type of attribute that describes an identifying characteristic of a person, or any combination thereof. At step 315, the processor generates a user profile from the user data. At step 320, the processor identifies at least one group of related users that can be based on at least the user profile. At step 325, the processor generates, on the graphical user interface and in response to a user selection of the at least one related search break, a plurality of subsets of the at least one related search break. As an example, the plurality of subsets of the at least one related search break can have a relationship with the at least one related group of users, such as a one-to-one relationship. At step 330, the user can input at least one search term and/or one or more selection of a subset of the plurality of subsets of the at least one related search break. At step 335, the processor categorizes at least one search result (e.g., product, service, activity, interest, etc.) of a plurality of search results based at least partially on the user data that the user inputted. As an example, the plurality of search results are stored in a database. The processor can then, at step 340, identify the chosen search result by choosing a search result that is categorized in both the at least one search term and the one or more selection of a subset of the plurality of subsets of the at least one related search break. At step 345, the processor generates, on the graphical user interface, the at least one chosen search result representative of the search results chosen at step 340. The user can share information related to a purchase or user selection of one or more of the chosen search results through use of a social media system. The untitled search breaks can be multiple search breaks. It will be appreciated that other configurations are possible.

Figure 6:
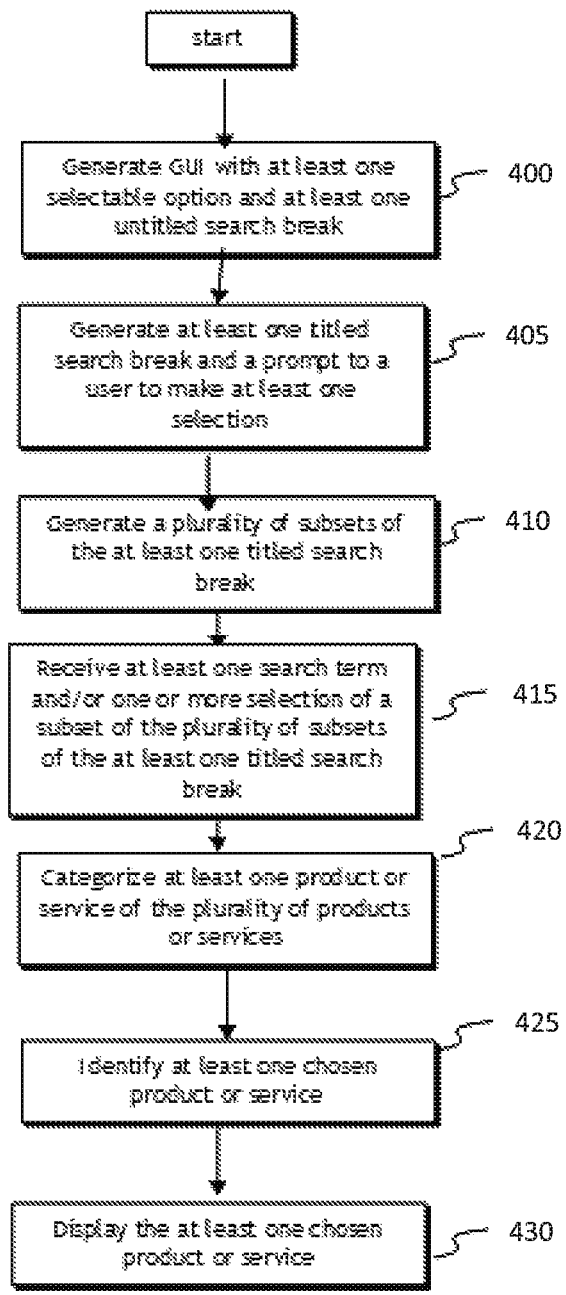
FIG. 6 illustrates a flow diagram for another non-limiting embodiment of a method for providing results based on user-selected search breaks according to the principles of the present invention.

Now referring to FIG. 6, a method for providing search results based on user-selected search breaks is shown according to another preferred and non-limiting embodiment or aspect. At first step 400, a graphical user interface with at least one selectable option and at least one untitled search break is generated by a processor. At step 405, in response to selection of a second selectable option, the processor generates at least one titled search break and a prompt to a user to make at least one selection. At step 410, in response to selection of the at least one titled search break, the processor generates a plurality of subsets of the at least one titled search break. As an example, a subset of the plurality of subsets of the at least one titled search break can have a relationship with a predetermined group of users, such as a one-to-one relationship. The predetermined group of users can be, for example, location, age, income, style, gender, or any combination thereof.

Still referring to FIG. 6, at step 415, the user inputs at least one search term and/or selects one or more of a subset of the plurality of subsets of the at least one titled search break, which the processor receives. At step 420, the processor categorizes a search result (e.g., a product, a service, an activity, an interest, searchable information, and/or the like) based on the predetermined groups of users and then stores the search results in the database. The processor can then, at step 425, identify the chosen search result by choosing a search result that is categorized in both the at least one search term and one or more of a subset of the plurality of subsets of the at least one titled break. At step 430, the processor can then display the at least one search result representative of the search results chosen at step 425. The user can share information related to a purchase or selection of the chosen search results through use of a social media system.

The untitled search breaks can be multiple search breaks. These multiple search breaks can be arranged such that the smaller ones are internal to the larger ones, in a layering fashion. Further, the untitled search breaks can have the shape of concentric circles, however, this is not meant to be construed in a limiting sense. The concentric circles can be separated into different shapes including squares, rectangles, or the like. Any of the shapes can have subsets that are selectable by the user, and the subsets will have relationships to groups of users. These subsets can be of different or related size. As shown in FIGS. 3A-3F, concentric circles can represent titled search breaks, where the titled search break is representative of a broad category. These titled search breaks are divided into subsets, such that each subset corresponds to a predetermined group of related users that is a subset of each category. The concentric circles can also represent related search breaks, where the search break is representative of a broad category, as shown in FIGS. 2A-2B. These related search breaks are divided into subsets, such that each subset corresponds to a group of related users that is a subset of each category and is generated based on user input. A related search break can also represent the user profile, independently.

In non-limiting embodiments or aspects, the methods described herein may be performed by at least one non-transitory computer-readable medium including program instructions that, when executed by at least one processor, cause one or more devices to perform the steps. A non-transitory computer-readable medium may include any medium capable of storing data such as, but not limited to, random-access memory (RAM), read-only memory (ROM), hard drives, compact and floppy discs, and/or other like media.

In non-limiting embodiments or aspects, the interface may enable a user to publicize or publish user-created content, such as a question, to the general public or a network of friends. For example, the question may be related to an item that the user is searching for, and the user may publish the question to receive help, advice, and answers from other users of the system of the present invention. The question-and-answer aspect of the system enhances the search capability by enabling users to "crowd source" assistance, such as when searching for a particular item. The feature may be visually identified by a separate selectable control, panel, or feature, such as a label titled "SOS," and may consist of a scrolling message that contains "user search needs" and a "help" button that can be used by other users to offer assistance.

In non-limiting embodiments or aspects, the interface for searching may include more than one search break, which may be visually represented by a set of non-overlapping geometric areas. The geometric areas may have different colors and may be configured for a user to select the area and/or drag a representation of the geometric area into a central selection area. The selection area may be larger than the other geometric areas and visually represent a set of search breaks selected by the user. Each geometric area may have a different color, and when the user selects and/or drags the geometric area, the color of the central selection area may change to represent the selections. For example, there may be five geometric areas colored blue, red, green, yellow, and white, which may represent a number of search breaks, such as location, style, gender, income, and age. By way of further example, the user may select and/or set a particular style (designated as red) and an income (designated as yellow) and an age (designated as white). The central selection area may change to the color red when a style is selected/set, then to orange when an income is selected/set, and then to light orange when an age is selected/set. This paint color-like mixing effect is just one of many non-limiting exemplary embodiments of the interface.

In non-limiting embodiments or aspects, the interface may include a visual design feature to allow users to easily identify other users who are more and/or less similar to them. The system may employ a visual identifier, such as a "halo," around other users' profile pictures to indicate a level of similarity of other users. The visual identifier may use differences in quantity, shape, color, size, movement, and/or the like to indicate variance in user similarity. For example, the interface may provide two halos around very similar users, one halo around somewhat similar users, and no halos around dissimilar users. Other configurations are possible. The ranking of "similarity" may be at least partially based on user profile data collected by the system. This feature enables users to quickly identify "like-minded" users, which is key information in evaluating the relevance of those users' opinions, advice, tastes, interests, item selections, and/or the like.

In non-limiting embodiments or aspects, the system of the present invention may include a database feature that ranks search results based on "item affinity" data from the "source user group" from which each particular search item is sourced. A "source user group" may be a set of users with common attributes, such as a friend group, a determined group of users, a predetermined community, a network of user profile connections, all users, and/or the like. In an example embodiment, the rank order in which items appear on the search results page may be determined by the number of "fetches," number of "likes," number of "re-fetches," and/or the like, which have occurred among the source user group. A "fetch" may be a first user post of a picture to the system platform. A "re-fetch" may describe when other users select and re-post an item that was originally posted by the first user. This feature can be expressed via the ordering of the item images on the results page (i.e., in front end design), and the ordering may be determined by a "back end" database algorithm.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment or aspect.

What is claimed is:

1. A computer-implemented method for providing a targeted search interface, the method comprising:
   generating, with a processor, a graphical user interface comprising at least one selectable option and at least one untitled search break;
   generating, with a processor and on the graphical user interface, in response to actuation of a first selectable option of the at least one selectable option, at least one related search break and a prompt to a user to input user data;
   receiving, from the user, the user data, wherein the user data comprises at least one of the following: age, gender, location, income, style, product type, service type, a search category, a parameter, a criterion, a keyword, natural language input, or any combination thereof;
   generating a user profile from the user data;
   identifying, by a processor, at least one group of related users based at least partially on at least the user profile; and
   generating, with a processor and on the graphical user interface or another graphical user interface, and in response to actuation of the at least one related search break, a plurality of subsets of the at least one related search break wherein a subset of the plurality of subsets of the at least one related search break has a relationship, such as a one-to-one relationship, with the at least one group of related users.

2. The computer-implemented method of claim 1, the method further comprising:
   receiving, via user input, at least one search term and/or one or more selection of a subset of the plurality of subsets of the at least one related search break;
   determining, by a processor, at least one chosen search result based at least partially on the at least one search term and/or the one or more selection of a subset of the plurality of subsets of the at least one related search break, the at least one chosen search result comprising at least one of the following: a product, a service, an activity, an interest, a searchable information, or any combination thereof; and
   generating, with a processor and on the graphical user interface, the at least one chosen search result.

3. The computer-implemented method of claim 2, wherein receiving one or more selection of the subset of the plurality of subsets of the at least one related search break comprises:
   a. receiving, via user input, the subset of the plurality of subsets of the at least one related search break;
   b. displaying, on the graphical user interface or another graphical user interface, in response to a selection of the subset of the plurality of subsets of the related search break, the at least one related search break;
   c. generating, with a processor and on the graphical user interface or another graphical user interface, in response to a next actuation of the at least one related search break, the plurality of subsets of the at least one related search break; and d. repeating steps a through c until the user is finished making selections or no more selections can be made.

4. The computer-implemented method of claim 3, the method further comprising sharing, via a social media system, information related to a purchase or user selection of the at least one chosen search result.

5. The computer-implemented method of claim 2, wherein determining, by a processor, at least one chosen search result based at least partially on the at least one search term and/or the one or more selection of the subset of the plurality of subsets of the at least one related search break, comprises:

categorizing, by a processor, at least one search result of the plurality of search results based at least partially on the user data, wherein the plurality of search results is stored in a database and comprises more than one of the following: a product, a service, an activity, an interest, a searchable information, or any combination thereof; and identifying, by a processor, the at least one chosen search result in response to determining that the at least one search result is categorized in both the at least one search term and the one or more selection of the subset of the plurality of subsets of the at least one related search break.

6. The computer-implemented method of claim 1, wherein the at least one untitled search break is a plurality of search breaks.

7. The computer-implemented method of claim 6, wherein shapes of the plurality of search breaks are concentric areas comprising at least one of the following: circles, ellipses, squares, triangles, or any combination thereof.

8. A computer-implemented method for providing a targeted search interface, the method comprising:

generating, with a processor, a graphical user interface comprising at least one selectable option and at least one untitled search break;

generating, with a processor and on the graphical user interface, in response to actuation of a second selectable option of the at least one selectable option, at least one titled search break and a prompt to a user to make at least one selection; and generating, with a processor and on the graphical user interface or another graphical user interface, in response to actuation of the at least one titled search break, a plurality of subsets of the at least one titled search break, wherein a subset of the plurality of subsets of the titled search break has a relationship, such as a one-to-one relationship, with a predetermined group of users.

9. The computer-implemented method of claim 8, wherein there is at least one predetermined group of users for at least one of the following: location, age, income, style, gender, or any combination thereof.

10. The computer-implemented method of claim 9, the method further comprising:

receiving, via user input, at least one search term and/or one or more selection of a subset of the plurality of subsets of the at least one titled search break;

determining, by a processor, at least one chosen search result based at least partially on the at least one search term and/or the one or more selection of the subset of the plurality of subsets of the at least one titled search break, the at least one chosen search result comprising at least one of the following: a product, a service, an activity, an interest, a searchable information, or any combination thereof; and displaying, on a visual display, the at least one chosen search result.

11. The computer-implemented method of claim 10, wherein receiving, via user input, at least one search term and/or one or more selections of at least one subset of the plurality of subsets of the subset of the at least one titled search break comprises:

a. receiving, via user input, the subset of the plurality of subsets of the at least one titled search break;

b. displaying, on the graphical user interface or another graphical user interface, in response to a selection of the subset of the plurality of subsets of the titled search break, the at least one titled search break;

c. generating, with a processor and on the graphical user interface or another graphical user interface, in response to a next actuation of the at least one titled search break, the plurality of subsets of the at least one titled search break; and d. repeating steps a through c until the user is finished making selections or no more selections can be made.

12. The computer-implemented method of claim 11, the method further comprising sharing, via a social media system, information related to a purchase or user selection of the chosen search result.

13. The computer-implemented method of claim 10, wherein determining, by a processor, at least one chosen search result based at least partially on the at least one search term and/or the one or more selection of a subset of the plurality of subsets of the at least one titled search break comprises:

categorizing, by a processor, at least one search result of the plurality of search results based at least partially on the predetermined group of users, the plurality of search results comprising more than one of the following: a product, a service, an activity, an interest, a searchable information, or any combination thereof; and identifying, by a processor, the at least one chosen search result in response to determining that the at least one search result is categorized in both the at least one search term and the one or more selection of a subset of the plurality of subsets of the at least one titled search break.

14. A system for providing a computer-implemented targeted search interface comprising:

a graphical user interface comprising at least one selectable option and at least one untitled search break;

a database comprising a plurality of search results, the plurality of search results comprising more than one of the following: a product, a service, an activity, an interest, a searchable information, or any combination thereof; and a processor, programmed or configured to, in response to actuation of the first selectable option of the at least one selectable option: (a) generate at least one related search break; (b) prompt the user to input user data; (c) receive, from the user, the user data; (d) generate, from the user data, a user profile; and (e) identify at least one group of related users based on at least the user profile; and, in response to actuation of the at least one related search break, (f) generate, on the graphical user interface or another graphical user interface, a plurality of subsets of the at least one related search break wherein a subset of the plurality of subsets of the at least one related search break has a relationship, such as a one-to-one relationship, with a group of related users.

15. The system of claim 14, wherein the processor is further programmed or configured to:
   receive, from the user, at least one search term and/or one or more selection of a subset of the plurality of subsets of the at least one related search break;
   determine at least one chosen search result based at least partially on the at least one search term and/or the one or more selection of the subset of the plurality of subsets of the at least one related search break, the at least one chosen search result comprising at least one of the following: a product, a service, an activity, an interest, a searchable information, or any combination thereof; and
   generate, on the graphical user interface, the at least one chosen search result.

16. The system of claim 15, wherein the processor is further programmed or configured to:
   (g) receive, via a user input, a subset of the plurality of subsets of the at least one related search break;
   (h) display, on the graphical user interface or another graphical user interface, in response to a selection of the subset of the plurality of subsets of the related search break, the at least one related search break;
   (i) generate, on the graphical user interface or another graphical user interface, in response to a next actuation of the at least one related search break, the plurality of subsets of the at least one related search break; and
   (j) repeat steps g through i until the user is finished making selections or no more selections can be made.

17. The system of claim 16, wherein the at least one untitled search break is the plurality of search breaks.

18. The system of claim 17, wherein shapes of the plurality of search breaks are concentric areas comprising at least one of the following: circles, ellipses, triangles, squares, or any combination thereof.

19. The system of claim 16, wherein the processor is further programmed or configured to:
   (k) categorize at least one search result of the plurality of search results based at least partially on the user data; and
   (l) identify at least one chosen search result in response to determining that the at least one search result is categorized in both at least one search term and at least a subset of the plurality of subsets of the at least one related search break.

20. A system for providing a computer-implemented targeted search interface comprising:
   a graphical user interface comprising at least one selectable option and at least one untitled search break;
   a database comprising a plurality of search results, the plurality of search results comprising more than one of the following: a product, a service, an activity, an interest, a searchable information, or any combination thereof; and
   a processor, programmed or configured to, in response to actuation of a second selectable option of the at least one selectable option: (a) generate, on the graphical user interface, at least one titled search break; (b) prompt the user to make at least one selection; (c) receive, from the user, at least one search term and/or a selection of at least a subset of the at least one titled search break; (d) determine at least one chosen search result based at least partially on the at least the search term and/or the at least a subset of the at least one titled search break, the at least one chosen search result comprising at least one of the following: a product, a service, an activity, an interest, searchable information, or any combination thereof; and (e) generate, on the graphical user interface, the at least one chosen search result; and, in response to actuation of the at least one titled search break (f) generate, a plurality of subsets of the at least one titled search break wherein a subset of the plurality of subsets of the titled search break has a relationship, such as a one-to-one relationship, with a predetermined group of users.

21. The system of claim 20, wherein the processor is further programmed or configured to perform the following steps: (g) receive, via user input, the subset of the plurality of subsets of the at least one titled search break; (h) display, on the graphical user interface or another graphical user interface, in response to a selection of the subset of the plurality of subsets of the titled search break, the at least one titled search break; (i) generate, on the graphical user interface or another graphical user interface, in response to a next actuation of the at least one titled search break, the plurality of subsets of the at least one titled search break; and (j) repeat steps g through i until the user is finished making selections or no more selections can be made.

22. The system of claim 21, wherein there is one predetermined group of related users for at least one of the following: location, age, income, style, gender, or any combination thereof.

23. The system of claim 22, wherein the processor is further programmed or configured to: (k) categorize at least one search result of the plurality of search results based at least partially on the predetermined group of users, wherein the search results are stored in a database; and (l) identify the at least one chosen search result in response to determining that the at least one search result is categorized in both the at least one search term and the at least a subset of the at least one titled search break.

24. The system of claim 23, wherein the processor is further programmed or configured to share, via a social media outlet, a purchase or user selection of the at least one chosen search result.

25. The system of claim 24, wherein the at least one chosen search result is chosen from a subset of search results having a relationship to at least one other user in a social network comprising at least one social connection to a user.

26. The system of claim 24, wherein the at least one chosen search result is chosen from a subset of search results having at least one attribute in common with a set of user-selected criteria representative of desired user characteristics.

* * * * *